Patented Oct. 26, 1926.

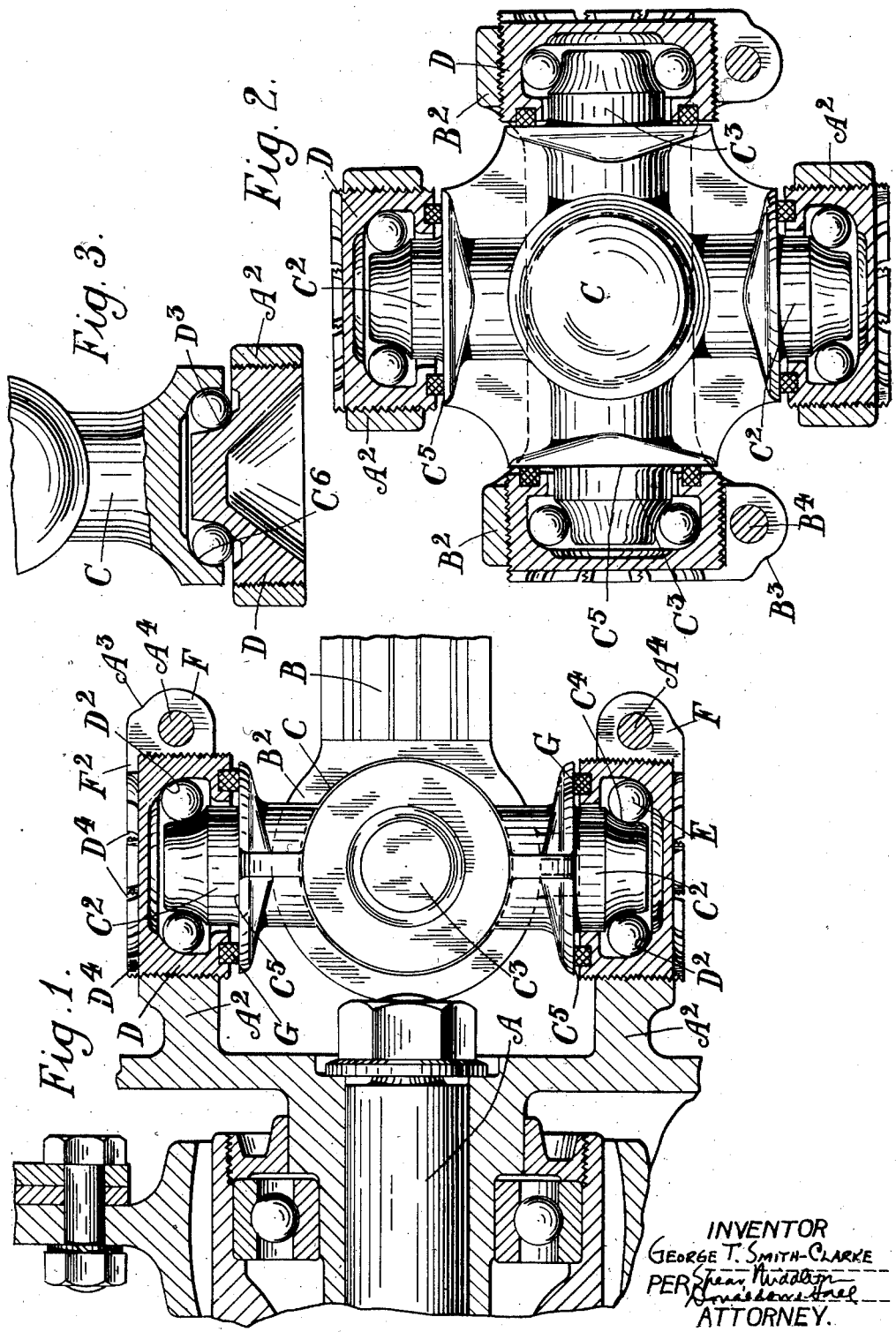

1,604,202

UNITED STATES PATENT OFFICE.

GEORGE THOMAS SMITH-CLARKE, OF COVENTRY, ENGLAND, ASSIGNOR OF ONE-HALF TO ALVIS CAR & ENGINEERING COMPANY, LIMITED, OF COVENTRY, ENGLAND, A BRITISH COMPANY.

UNIVERSAL JOINT.

Application filed February 13, 1925, Serial No. 8,954, and in Great Britain February 29, 1924.

This invention relates to universal joints, of the kind comprising a cross or starpiece, the ends of which are engaged by forks or the like on the respective shafts through the medium of antifriction bearings adapted to withstand both radial (lateral) and end thrust, and of the kind in which a single adjustment will take up wear in both these directions.

In a known construction of this kind the ends of the cross or starpiece were screw-threaded to receive the adjustable cones of a ball bearing and extended through cups provided in recesses in the forked jaws, a separate cap closing the recess, thus shielding the cone and balls within it and forming also a receptacle for lubricant, while packing rings have been provided to form fluid-tight joints between the cross or starpiece and the forked jaws.

The principal object of the present invention is to provide a construction which has fewer parts than the above and consequently is cheaper and simpler to manufacture.

According to this invention, inner races for balls or taper rollers are formed directly upon the ends of the arms of the cross or starpiece, and outer races are formed in adjustable caps screw-threaded into the forks of the shaft. Thus a very compact bearing is provided, with a minimum of parts, and lubricant applied to the bearing is concentrated around the races instead of lying idly in a cavity remote from them. Furthermore, the joint is very easy to assemble because when one or both caps are removed there is ample room in the holes provided for them to allow the tilting movement by which the cross or starpiece is brought into position in the forks.

In the accompanying drawings,

Figure 1 is a sectional elevation of the joint in the axial plane,

Figure 2 is an end view as seen from the right of Figure 1 partly in section and with the shaft nearest to the observer removed for clearness, and Figure 3 is a diagrammatic sketch showing a modification in the ball bearing.

The two shafts connected by the universal joint are indicated at A and B respectively, having forks $A^2$ and $B^2$ adapted to engage the opposite arms $C^2$ and $C^3$ respectively of the starpiece C.

In each of the forks $A^2$ and $B^2$ is provided a cap D having a screw-threaded engagement with the fork to enable it to be adjusted radially of the shaft centres. To clamp it when adjusted the forks are split at $A^3$ and $B^3$ and provided with tangent screws $A^4$, $B^4$ to close together the splits.

Within the caps D are provided the outer or cup races $D^2$ of the ball bearing, and upon the arms of the starpiece are formed the co-operating inner or cone races $C^4$, between which are located the balls E. The screw engagement of the caps with the forks of the shafts not only provides for the adjustment of the ball bearings, but it also permits accurate centralization of the starpiece, and thus also the alignment of the shafts A and B. When so adjusted, any tendency for the caps D to slack back may be prevented by the provision between the split forks, in engagement with the tangent screws $A^4$, $B^4$, of the locking members F which have lugs $F^2$ adapted to engage notches $D^4$ in the outer ends of the caps D, thereby effectively to prevent their rotational movement.

As will clearly be seen, the cup and the cone ball bearing illustrated is adapted to withstand both radial and end thrust, and furthermore centrifugal force upon the balls does not tend to jam them in the races, as would be the case with a single track radial thrust ball bearing.

When rotating, centrifugal force causes the lubricant to collect and be retained upon the outer ball race, so that efficient lubrication is ensured. To prevent its leakage when the shaft is at rest packing rings G of felt or any other suitable material may be provided between the mouth of the cap D and a shoulder $C^5$ formed on the starpiece C around the races thereon. Obviously, if preferred, the packing rings G could be arranged between the respective adjacent peripheral surfaces of the cap and the arm of the starpiece instead of as shown. The lubricant can be introduced into the caps D by means of suitable nozzles provided at their outer ends.

By an obvious modification of the above described arrangement of the ball races, the cup races may be formed at $C^6$ in the ends of the starpiece, and the cone races may be formed at $D^3$ in the caps D as illustrated diagrammatically in Figure 3, a packing ring (not shown but similar to G in Figure 1) being located between the cap D and the end of the starpiece.

As a further alternative, instead of employing ball bearings, taper rollers may be employed in the known manner adapted to withstand axial and radial thrust.

It will be evident that the invention provides a simple and relatively inexpensive construction in which very few parts are employed, and in which efficient lubrication is ensured. The joint requires no enclosure, such as is usually necessary with ordinary universal joints, it can be accurately centered and so maintained by adjustment if wear necessitates it, and what is of the utmost importance, it is adapted to withstand very high revolution speeds, as for example, several thousands per minute. In this connection the locking means are of a substantial nature minimizing any danger of loose parts at high speed.

What I claim as my invention and desire to secure by Letters Patent of the United States is:—

1. In a universal joint, a star-piece comprising arms, each arm having an integral circumferential flange near its outer end and an annular bearing race comprising its outer end, a yoke each leg of which is in proximity to an end of an arm, a dished cap adjustably mounted in each leg of said yoke and adapted to cover the end of an arm and providing a complementary raceway with said first mentioned bearing race, anti-friction means disposed in the raceway thus formed, and a resilient washer interposed between the cap rim and the flange and adapted upon adjustment of the cap, to be clamped or compressed between the cap rim and flange to provide a liquid seal.

2. In a universal joint a star-piece comprising arms, each arm being provided with a circumferential flange near its outer end and an annular bearing race formed by curvedly tapering the outer end of the arm, a yoke each leg of which is in proximity to an end of an arm, a dished cap adjustably mounted in each leg of said yoke and adapted to cover the end of an arm and providing a complementary raceway with said first mentioned bearing race, anti-friction means disposed in the raceway thus formed, and a resilient washer interposed between the cap rim and the flange, said cap being of substantially the same diameter as the flange whereby it is adapted upon adjustment to clamp the washer between the flange and cap rim to provide a liquid seal.

3. A device according to claim 2 in which each leg of said yoke is split, and a tangent screw in each leg adapted to fixedly secure the cap in the leg, said cap being provided on its exterior face with openings, and a locking member pivotally mounted upon the tangent screw and adapted to be inserted in the said openings to lock the cap in position.

In testimony whereof I have signed my name to this specification.

GEORGE THOMAS SMITH-CLARKE.